(12) United States Patent
Elliott et al.

(10) Patent No.: US 11,407,946 B2
(45) Date of Patent: Aug. 9, 2022

(54) COMBINED HYDROTHERMAL LIQUEFACTION AND CATALYTIC HYDROTHERMAL GASIFICATION SYSTEM AND PROCESS FOR CONVERSION OF BIOMASS FEEDSTOCKS

(71) Applicant: Battelle Memorial Institute, Richland, WA (US)

(72) Inventors: Douglas C. Elliott, Richland, WA (US); Gary G. Neuenschwander, Burbank, WA (US); Todd R. Hart, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 16/179,495

(22) Filed: Nov. 2, 2018

(65) Prior Publication Data
US 2019/0071606 A1 Mar. 7, 2019

Related U.S. Application Data

(60) Division of application No. 15/693,354, filed on Aug. 31, 2017, now Pat. No. 10,138,426, which is a continuation of application No. 13/893,011, filed on May 13, 2013, now Pat. No. 9,758,728.
(Continued)

(51) Int. Cl.
*C10G 1/06* (2006.01)
*C10G 3/00* (2006.01)
(Continued)

(52) U.S. Cl.
CPC ............... *C10B 49/16* (2013.01); *C10G 1/06* (2013.01); *C10G 1/065* (2013.01); *C10G 3/40* (2013.01);
(Continued)

(58) Field of Classification Search
None
See application file for complete search history.

(56) References Cited

U.S. PATENT DOCUMENTS 2,935,469 A 12/1952 Vose
4,072,614 A * 2/1978 Harris ................. B01D 17/045
210/305
(Continued)

FOREIGN PATENT DOCUMENTS

CN 102071038 5/2011
CN 102382683 3/2012
(Continued)

OTHER PUBLICATIONS

Machine translation for JP 2008-249207 A (Oct. 2008). Retrieved from Espacenet on Jun. 17, 2019. (Year: 2019).*
(Continued)

*Primary Examiner* — Jennifer A Leung
(74) *Attorney, Agent, or Firm* — Wells St. John P.S.

(57) ABSTRACT

A combined hydrothermal liquefaction (HTL) and catalytic hydrothermal gasification (CHG) system and process are described that convert various biomass-containing sources into separable bio-oils and aqueous effluents that contain residual organics. Bio-oils may be converted to useful bio-based fuels and other chemical feedstocks. Residual organics in HTL aqueous effluents may be gasified and converted into medium-BTU product gases and directly used for process heating or to provide energy.

8 Claims, 4 Drawing Sheets

Related U.S. Application Data

(60) Provisional application No. 61/657,416, filed on Jun. 8, 2012.

(51) Int. Cl.
*C10J 3/00* (2006.01)
*C10B 49/16* (2006.01)
*C10L 3/08* (2006.01)
*C10L 9/08* (2006.01)

(52) U.S. Cl.
CPC ............... *C10G 3/50* (2013.01); *C10J 3/00* (2013.01); *C10L 3/08* (2013.01); *C10L 9/08* (2013.01); *C10L 9/086* (2013.01); *C10J 2200/06* (2013.01); *C10J 2300/0916* (2013.01); *C10J 2300/0973* (2013.01); *C10J 2300/1681* (2013.01); *Y02E 50/10* (2013.01); *Y02P 20/145* (2015.11); *Y02P 30/20* (2015.11)

(56) References Cited

U.S. PATENT DOCUMENTS

| | | | |
|---|---|---|---|
| 4,319,021 | A | 3/1982 | Irani et al. |
| 4,442,006 | A | 4/1984 | Ishida et al. |
| 9,756,728 | B2 | 9/2017 | Elliott et al. |
| 2005/0113611 | A1 | 5/2005 | Adams |
| 2008/0299018 | A1* | 12/2008 | Agee ............ C10L 1/02 422/187 |
| 2009/0259082 | A1* | 10/2009 | Deluga ......... C10G 1/002 585/14 |
| 2010/0038284 | A1* | 2/2010 | Vergel ......... B01J 8/0488 208/89 |
| 2010/0170147 | A1 | 7/2010 | McNeff |
| 2011/0139597 | A1 | 6/2011 | Lin |
| 2011/0167713 | A1 | 7/2011 | Quignard et al. |
| 2011/0174734 | A1* | 7/2011 | Seibert ......... B01D 61/246 210/650 |
| 2011/0213188 | A1 | 9/2011 | Agblevor et al. |
| 2011/0245444 | A1* | 10/2011 | Miller ............ C07C 15/06 526/346 |
| 2011/0294175 | A1* | 12/2011 | Bellussi ........ C12M 23/58 435/134 |
| 2012/0022278 | A1* | 1/2012 | Aravanis ........ C12N 1/06 554/8 |
| 2012/0055077 | A1 | 3/2012 | Savage et al. |
| 2013/0205652 | A1 | 8/2013 | Humphreys et al. |
| 2013/0206571 | A1 | 8/2013 | Heilmann et al. |
| 2014/0099691 | A1 | 4/2014 | Iversen |
| 2015/0126758 | A1 | 5/2015 | Elliott et al. |

FOREIGN PATENT DOCUMENTS

| | | |
|---|---|---|
| CN | 102827633 | 5/2015 |
| JP | 2008249207 A * | 10/2008 |
| WO | WO 2011/ 143380 | 11/2011 |
| WO | WO PCT/US2013/ 041214 | 10/2013 |
| WO | WO PCT/US2013/ 041214 | 12/2014 |
| WO | WO PCT/US2016/ 036622 | 9/2016 |
| WO | WO PCT/US2016/ 036622 | 12/2017 |

OTHER PUBLICATIONS

Machine translation for CN 102382683 A (Mar. 2012). Retrieved from Espacenet on Jun. 17, 2019. (Year: 2019).*
Zhang et al. Bio-crude production from secondary pulp/paper-mill sludge and waste newspaper via co-liquefaction in hot compressed water. Energy 36 (2011) 2142-2150. (Year: 2011).*
Peterson et al. Thermochemical biofuel production in hydrothermal media: A review of sub- and supercritical water technologies. Energy Environ. Sci., 2008, 1, 32-65. (Year: 2008).*
Zhou et al. Hydrothermal Liquefaction of Macroalgae Enteromorpha prolifera to Bio-oil. Energy Fuels, 2010, 24, 4054-4061. (Year: 2010).*
Elliott, D.C., et al., Hydrothermal liquefaction of biomass: Developments from batch to continuous process, Oct. 2014, Bioresource Technology, 178 (2015) pp. 147-156.
Or, C., et al., "Numerical Simulation of CO2 Gas Microbubble of Foamy Oil", 2014, Energy Procedia, vol. 63, pp. 7821-7829.
Peterson, A.A., et al., "Thermochemical biofuel production in hydrothermal media: A review of sub- and supercritical water technologies", 2008, Energy Environ. Sci., vol. 1, pp. 32-65.
"Alfa-Laval—spiral heat exchangers" (Mar. 25, 2005); pp. 1-17.
"Automatic Centrifuges" (Nov. 2, 2011); pp. 1-4.
Elliott, D.C., et al., "Catalytic Hydrothermal Gasification of Lignin-Rich Biorefinery Residues and Algae", Final Report, Prepared for the U.S. Department of Energy under Contract DE-AC06-76RLO 1830, PNNL-18944, (2009).
Elliott, D.C., et al., "Chemical Processing in High-Pressure Aqueous Environments. 7. Process Development for Catalytic Gasification of Wet Biomass Feedstocks", Ind. Eng. Chem. Res. (2004), 43, pp. 1999-2004.
Frank, E.D., et al. Life cycle comparison of hydrothermal liquefaction and lipid extraction pathways to renewable diesel from algae, Mitigation and Adaptation Strategies for Global Change, vol. 18, Issue 1, (2012), 137-158.
Haiduc, A.G., "SunCHem: an integrated process for the hydrothermal production of methane from microalgae and CO2 mitigation", J. Appl. Phycol. (2009), 21, pp. 529-541.
Toor, Saqib S., et al. "Hydrothermal liquefaction of biomass: A review of subcritical water technologies", Energy, 36, (2011), pp. 2328-2342.
Zhang, L., et al. "Supercritical water gasification of an aqueous by-product from biomass hydrothermal liquefaction with novel Ru modified Ni catalysts", Bioresource Technology, 102 (2011), pp. 8279-8287.

* cited by examiner

COMBINED HYDROTHERMAL LIQUEFACTION AND CATALYTIC HYDROTHERMAL GASIFICATION SYSTEM AND PROCESS FOR CONVERSION OF BIOMASS FEEDSTOCKS

CROSS REFERENCE TO RELATED APPLICATION

This application is a divisional of U.S. patent application Ser. No. 15/693,354 which was filed Aug. 31, 2017, entitled "Combined Hydrothermal Liquefaction and Catalytic Hydrothermal Gasification System and Process for Conversion of Biomass Feedstocks" which is a continuation of U.S. patent application Ser. No. 13/893,011 which was filed 13 May 2013 entitled "Combined Hydrothermal Liquefaction and Catalytic Hydrothermal Gasification System and Process for Conversion of Biomass Feedstocks", now U.S. Pat. No. 9,758,728 issued Sep. 12, 2017, which claims priority from U.S. Provisional Patent Application No. 61/657,416 filed 8 Jun. 2012 entitled "Combined Hydrothermal Liquefaction and Catalytic Hydrothermal Gasification for Conversion of Biomass Feedstocks", each of which is incorporated herein in its entirety.

STATEMENT REGARDING RIGHTS TO INVENTION MADE UNDER FEDERALLY-SPONSORED RESEARCH AND DEVELOPMENT

This invention was made with Government support under Contract DE-AC05-76RLO-1830 awarded by the U.S. Department of Energy. The Government has certain rights in the invention.

FIELD OF THE INVENTION

The invention relates generally to biomass conversion systems and processes. More particularly, the invention relates to a combined hydrothermal liquefaction and catalytic hydrothermal gasification system and process for conversion of biomass to suitable chemical feedstocks for fuel production.

BACKGROUND OF THE INVENTION

Aqueous effluents released from hydrothermal liquefaction (HTL) facilities may contain byproducts that include dissolved organic materials. Organic materials in the aqueous HTL effluents may be relatively dilute (~2% carbon by weight) but also represent a large volume, constituting as much as 40% of the total carbon in the original biomass feedstock. Thus, recovery of these organic materials and reuse of the heated water stemming from these effluent streams is key to maintaining overall energy efficiency of biomass conversion. Accordingly, new approaches for processing of these aqueous effluent streams are needed. The present invention addresses these needs.

SUMMARY OF THE INVENTION

The present invention includes a combined hydrothermal liquefaction and catalytic hydrothermal gasification (HTL-CHG) system for conversion of biomass to bio-oils and recovery and conversion of residual organics in aqueous effluent streams to bio-based fuels and other value-added chemicals. The system may include a first hydrothermal liquefaction (HTL) stage that converts biomass in an aqueous medium at a temperature and pressure selected to form a conversion product that includes a separable bio-oil and an aqueous fraction containing residual organics. The aqueous fraction containing residual organics may be introduced as an effluent stream from the HTL stage reactor directly into a catalytic hydrothermal gasification (CHG) stage reactor at a temperature and pressure selected to form a product gas containing at least one hydrocarbon or other medium BTU product gas. Combustion of the product gas may be performed to provide a net positive release of energy from conversion of the biomass. Minerals obtained from the aqueous stream in the CHG may be used as nutrients for growth of plants or another biomass source from which biomass may be grown and harvested for use in another biomass conversion cycle in the HTL-CHG system.

Heat exchangers may also be positioned to recover heat that preheats biomass feedstocks introduced to the HTL stage; to deliver heat to selected processes employed in conversion of biomass feedstocks in the HTL stage; to provide finishing heat needed to bring effluent streams to full stage or process temperatures; to recover heat from various aqueous stream effluents that may be distributed to preheat biomass feedstocks introduced to the HTL stage or process; to provide heat to other stages employed in the conversion of biomass feedstocks; to provide "finishing" heat needed to bring aqueous effluents to full stage process temperatures; including combinations of these various purposes. Heat exchangers suitable for use include, but are not limited to, e.g., counter-current heat exchangers; burner-type heat exchangers; make-up heat exchangers and heaters; and combinations of these various heating devices. No limitations are intended.

The present invention also includes a process for conversion of biomass to bio-oils suitable for generation of bio-based fuels, hydrocarbon-containing product gases (e.g., medium BTU gases), and minerals suitable for use as nutrients for growth of plant materials or other biomass sources. The process may include hydrothermally liquefying (HTL) a biomass in an aqueous medium at a temperature and pressure selected to form a conversion product including a separable bio-oil and an aqueous fraction containing residual organics. The process may also include catalytically and hydrothermally gasifying (CHG) residual organics in the aqueous fraction released from the HTL stage or process at a temperature and pressure selected to form a product gas. The product gas may contain at least one hydrocarbon or other medium BTU product gas. Combustion of the hydrocarbon product gas may be used to provide a net positive release of energy from conversion of the biomass.

The biomass may be derived from plants, algae, photosynthetic cyanobacteria, animal waste, industrial food and liquid processing wastes (e.g., meat solids and dairy liquids), other biomass materials (e.g., wood), and combinations of these various biomass types. Algae may be a macroalgae, a microalgae, or a combination of a macroalgae and a microalgae. Macroalgae may be a sea weed, kelp, or combinations of various macroalgae sources.

Biomass-containing sources may include lignin, carbohydrates, proteins, lipids, triacylglycerides (TAGs), free fatty acids, and combinations of these various compounds. Bio-oil generated from biomass-containing sources in the HTL stage or process may include components derived from lignin, carbohydrates, proteins, lipids, membrane lipids, phospholipids, triacylglycerides, free fatty acids, and combinations of these various compounds. Exemplary compounds present in bio-oils of the present invention include, but are not limited to, e.g., lipid-derived hydrocarbons; cyclic hydrocarbons containing oxygen; carbohydrate conversion products, protein conversion products; cyclic oxygenates derived from carbohydrates and proteins; derivatives of these various compounds; and combinations of these various compounds.

The biomass conversion system or process may be a continuous system or process or a batch-wise system or process. For example, liquefaction and gasification of the present invention may be performed in separate reactor stages concurrently or sequentially. Liquefaction may include flowing biomass through an HTL stage or process. Gasification may include flowing HTL effluents through a CHG stage or process. In some applications, flowing biomass and HTL effluents may be performed with a single pumping unit without a change in operating pressure.

The conversion product may be a mixture or dispersion containing a separable bio-oil and a water fraction containing residual organics. Liquefaction may include separating the bio-oil from the aqueous fraction containing residual organics at a selected temperature and pressure. For example, in some applications, the hydrothermal liquefaction (HTL) stage or process may include an intermediate separation of bio-oil generated in the HTL. The conversion product containing the combined bio-oil/water mixture or dispersion may be separated in a separator and the separated aqueous phase containing residual organics diverted to the CHG stage or process.

Separation temperatures may be selected between ambient and about 360° C. Separation pressures may be selected between ambient and about 210 atmospheres ($2.13 \times 10^4$ kPa). Operations at the higher end of the range of temperature and pressure, absent an intermediate cooling step, can result in higher process efficiencies, which are desirable, but not required. Separation may include introducing the aqueous phase containing the residual organics into a CHG stage or process for gasification therein.

The HTL stage or process may be coupled directly with the CHG stage or process such that the HTL stage and the CHG stage may operate at the same temperature and pressure conditions. Liquefaction and gasification are performed at temperatures and pressures that maintain a liquid water phase in each of the process stages during operation. Liquefaction and gasification temperatures may be selected up to about 360° C., or between about 300° C. and about 360° C. Liquefaction and gasification pressures may be selected up to about 210 atmospheres, or between about 100 atmospheres and about 210 atmospheres. Operation of both the HTL and CHG stages at the same temperature and pressure can reduce need for re-heating and/or re-pressurizing of aqueous stream effluents released from the HTL stage to reaction conditions needed for gasification when entering the CHG stage. Elimination of re-heating and re-pressurizing of HTL effluents can override costs for processing dilute aqueous phase fractions containing residual organics released from the HTL. And, with the energy requirement for pressurizing and heating absent or significantly reduced, the gasification product (e.g., medium BTU gas hydrocarbon) obtained from in the CHG stage and process can provide a net positive release of energy upon combustion.

In some applications, pressurizing each of the liquefaction and gasification stages may be performed with a single pumping unit without a change in operating pressure.

Gasification may involve recycling heat released from the CHG stage or process and providing heat to another HT liquefaction cycle and/or a CH gasification cycle. CHG can be an efficient method for recovering energy from organics present in water stream effluents. For example, residual organic materials present in the water effluents released from the HTL stage or process may be converted in the CHG stage or process over a catalyst. Gasification catalysts employed in the CHG stage or process may include, but are not limited to, e.g., ruthenium (Ru), rhodium (Rh), osmium (Os), nickel (Ni), copper (Cu), including combinations of these catalysts. The CHG stage or process may contain a hot, pressurized water environment that yields a low-carbon number hydrocarbon product gas (so-called medium-BTU product gas) such as methane that may also contain other gases such as carbon dioxide.

The product gas may include methane ($CH_4$) and/or a higher hydrocarbon, carbon dioxide, and less than 5% hydrogen by weight.

Conversion of the aqueous byproducts (effluents) containing residual organics can maximize efficiency of biomass conversion in hydrothermal liquefaction and gasification facilities and processes.

Gasification of the residual organics in the aqueous phase released from the HTL in the CHG stage or process may yield a nutrient-rich aqueous phase that contains minerals, ammonium, and dissolved carbon dioxide suitable for growing plants or algae from which a biomass feedstock may be derived. Thus, the mineral-rich aqueous phase from the CHG may be used as a nutrient medium.

Evaporation of water from effluent streams exiting the HTL stage or process is not required before the effluents enter the CHG stage or process. Processing of aqueous hydrothermal liquefaction byproducts received from the HTL represents a new component in the processing arts for energy recovery, as no other options for use of these aqueous byproducts have been developed to date.

The purpose of the foregoing abstract is to enable the United States Patent and Trademark Office and the public generally, especially the scientists, engineers, and practitioners in the art who are not familiar with patent or legal terms or phraseology, to quickly determine from a cursory inspection the nature and essence of the technical disclosure of the application. The abstract is neither intended to define the invention of the application, which is measured by the claims, nor is it intended to be limiting as to the scope of the invention in any way. A more complete appreciation of the invention will be readily obtained by reference to the following description of the accompanying drawings in which like numerals in different figures represent the same structures or elements.

DETAILED DESCRIPTION OF THE PRESENT INVENTION

A combined hydrothermal liquefaction (HTL) and catalytic hydrothermal gasification (CHG) system and process are described for conversion of biomass to suitable bio-oils for generation of bio-based fuels, and residual organics suitable for generation of energy-producing (so-called medium BTU) hydrocarbon-containing product gases that together maximize efficiency of biomass conversion in hydrothermal and gasification facilities. The following description includes a best mode of the present invention. While preferred embodiments of the present invention will now be described in reference to conversion of biomass derived from algae, the invention is not intended to be limited thereto. For example, it will be apparent that various modifications, alterations, and substitutions to the present invention may be made. The invention is intended to cover all modifications, alternative constructions, and equivalents falling within the scope of the present invention as defined in the claims listed hereafter. Accordingly, the description of exemplary embodiments should be seen as illustrative only and not limiting.

Figure 1:
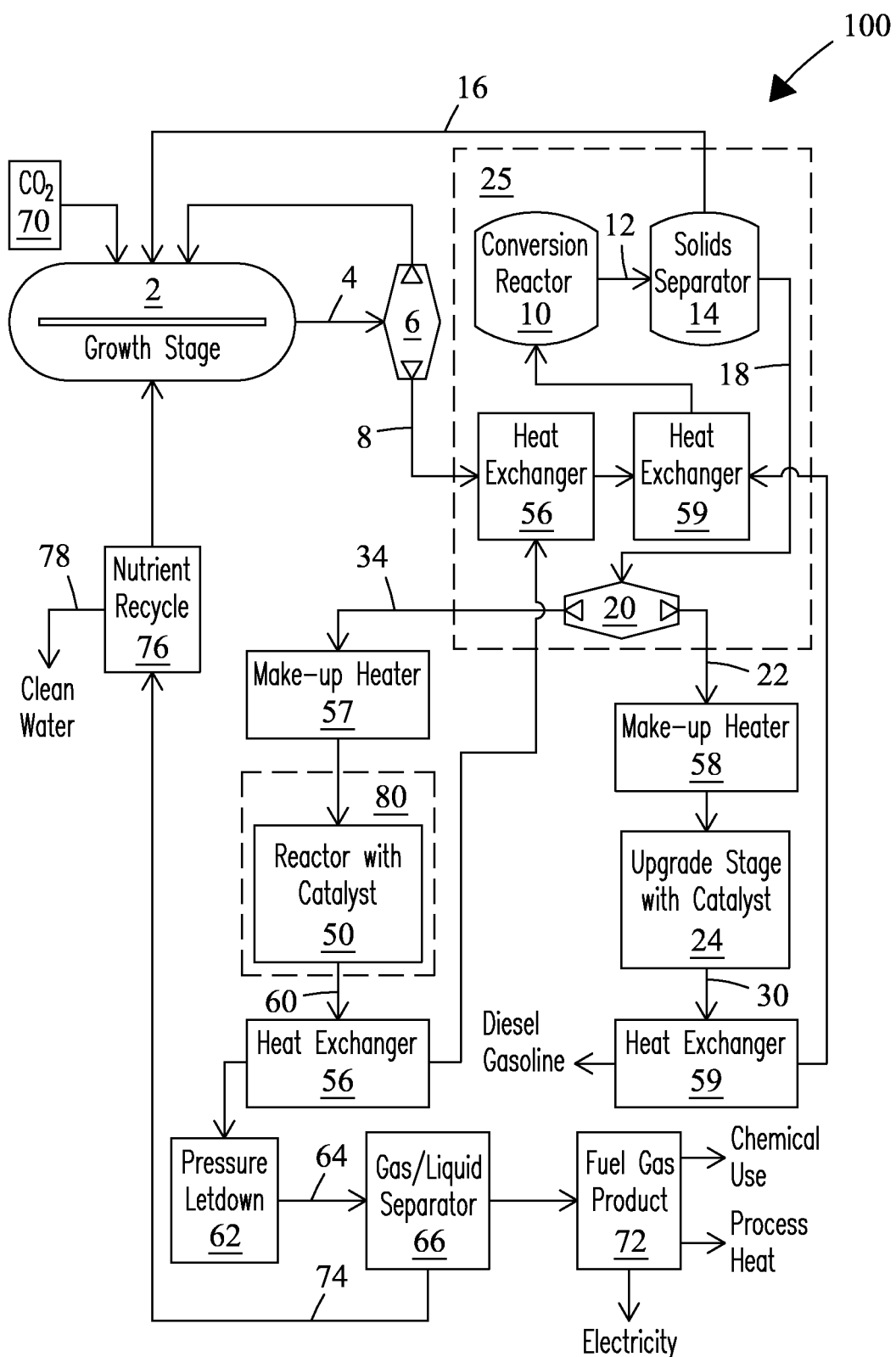
FIG. 1 shows a combined HTL-CHG system for conversion of biomass to bio-oil and hydrocarbon fuel products according to one embodiment of the present invention.

FIG. 1 shows a combined Hydrothermal Liquefaction (HTL)-Catalytic Hydrothermal Gasification (CHG) system 100 of the present invention. System 100 may include an HTL stage 25 and process that converts biomass to bio-oil and a CHG stage 80 and process that converts residual organics in the aqueous effluent stream released from HTL stage 25 to energy-producing (so-called medium BTU) hydrocarbon-containing product gas 72, as detailed hereafter. The term "residual organics" refers to organic compounds that remain in the aqueous stream effluents released from the HTL stage after liquefaction and conversion of the biomass feedstocks. The term "medium BTU product gas" as used herein means a hydrocarbon product gas containing between about 40% and about 70% methane with other gases (e.g., $CO_2$) making up the difference. Medium BTU product gases are between "low BTU" gases containing below 10% methane down to no methane gas and "high BTU" gases containing greater than 70% methane up to 100% methane.

Biomass Feedstocks

Biomass feedstocks may be obtained from various plants and animal wastes, but are not intended to be limited to these exemplary sources. In some embodiments, algae may be used as a biomass feedstock. Algae has advantages as a biomass source including, e.g., high growth potential, high yields per unit area, algae can be introduced into the conversion system or process as a slurry without extraction or further processing, and the ease of gasification. Algae suitable for use include, but are not limited to, e.g., non-lipid producing algae, filamentary algae, macroalgae, cyanobacteria, mixed algae, microalgae, diatoms, including combinations of these various algae. Exemplary and representative algae include, e.g., *Spirulina, Chara, Nannochloropsis*, and like algae. No limitations are intended by the disclosure of these exemplary classes. All biomass feedstocks as will be employed by those of ordinary skill in the art in view of this disclosure are within the scope of the present invention.

In some embodiments, biomass conversion may be performed using whole algae or algae biomass after lipids are extracted, i.e., lipid-extracted algae (LEA). With LEA feedstocks, gasification reactions in the CHG stage or process can be fast (<1 hour) and complete (>99%). Typical CHG yields when using LEA feedstocks may be on the order of ~0.4 liters of methane per gram dry solids.

In some embodiments, algae biomass solids may be introduced in the HTL stage in an aqueous medium, e.g., as a slurry. In various embodiments, the slurry may contain up to about 35% biomass solids by weight. In some embodiments, the slurry may contain between about 20% and about 35% biomass solids by weight. No limitations are intended.

In some embodiments, biomass-containing feedstocks (sources) may include various organic materials including, but not limited to, e.g., triacylglycerides (TAGs), free fatty acids (FFAs), other membrane lipids including phospholipids, proteins, carbohydrates, starches, and combinations of these feedstock materials.

Bio-oils derived from these biomass-containing sources (obtained upon conversion in the HTL stage) may include oils characteristic of these various bio-derived materials including, but not limited to, e.g., free fatty acids, long-chain hydrocarbons and oxygenated cyclic hydrocarbons. In addition, starches, sugars, and proteins present within the cells of the biomass may be converted to bio-oil. No limitations are intended by the disclosure of these exemplary compounds.

Hydrothermal Liquefaction (HTL) processing is a highly efficient method of producing fuel from algae. HTL can produce bio-oils at a high yield from both lipid-producing and non-lipid-producing algae. The bio-oil fraction and water fraction exiting from the HTL stage or process can be separated into separate streams as detailed further herein. Because the HTL stage or process can produce bio-oil directly from any algae, TAG-producing algae required by conventional conversion systems are not required. And, when used, TAG-producing algae are converted to bio-oil, increasing the total oil yield. In addition, quality of the bio-oil may be higher when the TAG content is higher, meaning less oxygen and acid content, which results in easier upgrading compared with bio-oil produced from other biomass sources.

In FIG. 1, system 100 may include a biomass growth stage 2 (e.g., a growth pond) where biomass including, e.g., algae or other plant-derived biomass feedstocks may be grown and harvested. Wet biomass 4 derived from biomass growth stage 2 may be concentrated in a concentrator 6 where excess water may be removed. In concentrator 6, a typical algae feedstock concentration may be increased, e.g., from about 0.6 grams of algae or biomass per liter (e.g., as recovered from growth stage 2) to about 100 grams algae or biomass per liter or better. However, concentrations suitable for use are not intended to be limited.

In the figure, the wet concentrated biomass feedstock 8 may be introduced to HTL stage 25. In HTL stage 25, wet biomass feedstock 8 may be introduced to HTL reactor 10. HTL reactor 10 may be a pressurized reactor. Hydrothermal liquefaction (HTL) processing in HTL reactor 10 may employ heat, pressure, and water to convert biomass feedstock 8 containing various organic materials into a crude conversion product 12 that includes separable bio-oil, water, and solids fractions. The term "separable" means each of the bio-oil, water, and solids fractions in conversion product 12 may be separated from the other fractions, e.g., by gravity separation. When separated, bio-oil fractions may be converted to usable bio-based fuels, residual organics in the water fractions may be gasified in a downstream gasifier, and solids fractions can be recycled, e.g., as detailed further herein.

Introduction of biomass as a wet feedstock 8 directly into HTL stage 25 eliminates need for drying, solvent extraction, and recovery of solids from extraction solvents. Total bio-oil yields obtained by the present invention can be higher than those obtained for processes requiring solvent extraction as practiced in the conventional art. In addition, temperatures used in the HTL stage may be lower than those employed in conventional dry pyrolysis reactors.

Solids 16 present within the crude conversion product 12 containing, e.g., solids 16, bio-oil 22, and water 34 exiting HTL reactor 10 after conversion of biomass 8 may be separated from conversion product 12, e.g., in a solids separation stage (solids separator) 14. The term "solids" as used herein means phosphorus-containing (P) solids, sulfate-containing precipitates, and/or solids containing insoluble minerals (e.g., Ca, Mg, Fe, etc.) obtained from aqueous stream effluents 34 exiting HTL reactor 10. Separation of precipitates is detailed, e.g., by Elliott in U.S. Pat. No. 8,241,605, which reference is incorporated in its entirety herein.

Solids 16 recovered from solids separation stage 14 may be recycled, e.g., as nutrients back into growth stage 2 to feed new generations of plants from which biomass feedstocks 8 may be derived. Solids separator 14 may be positioned, e.g., after HTL stage reactor 10 upstream from CHG stage reactor 50 to remove solids 16 (e.g., minerals and other solids) that can poison catalysts used in CHG gasifier 50, but position is not intended to be limited. Separation of solids 16 from crude conversion product 12 in solids separation stage 14 may yield a solids-free conversion product 18 containing bio-oil 22 and water 34. Bio-oil 22 and water 34 present in conversion product 18 may be separated into a separate bio-oil 22 fraction and an aqueous fraction 34 containing residual organics, e.g., in a separation stage 20 disposed, e.g., downstream from separation stage 14.

Separators suitable for use in concert with the present invention are not limited. Number and position of separators are also not limited. Separators may include, e.g., LUCID® separators available commercially (Pall Corp., Port Washington, N.Y., USA). In some embodiments, separators may include an internal geometry that promotes coalescing or enlargement of bio-oil droplets, with a discharge path for continuous separation of discontinuous-phase droplets of the crude conversion products into individual bio-oil and water (aqueous effluent) fractions. In various embodiments, separators may be employed that are self-cleaning, and/or require no auxiliary utilities, electrostatics, controls, or chemical additives to function. In addition, separators may also employ hardware that is compatible with a broad range of fluids and resistant to various corrosive solids. Separators may also be employed that have an enclosed separation stage that eliminates potential for odors or hazards reaching operators.

Aqueous effluent 34 containing residual organics released from HTL stage 25 may be introduced directly into a catalytic hydrothermal gasification (CHG) stage 80 containing a catalytic (CHG) reactor 50. In CHG reactor 50, residual organics present within aqueous feed 34 may be gasified and converted over a gasification catalyst such as ruthenium (Ru) on a carbon (C) support into a raw product (e.g., a "medium BTU") gas containing methane ($CH_4$) and $CO_2$ that may be released in an effluent stream 60 from CHG reactor 50. Aqueous effluent 60 may also be rich in heat. Effluent 60 released from CHG stage 80 may be delivered to a pressure release stage (or a pressure "letdown" stage) 62 where pressure may be reduced and/or vented and where the raw product gas in the effluent may be allowed to expand. Reduced pressure gas/liquid effluent 64 released from Pressure Release Stage 62 may be subsequently delivered to a gas/liquid separator 66 and separated into a raw hydrocarbon product gas 72 fraction that contains methane (or other medium-BTU gas) and $CO_2$, and an aqueous effluent 74 containing nutrients 76. Raw hydrocarbon product gas 72 may be subsequently cleaned of $CO_2$ to produce a clean hydrocarbon product gas (e.g., methane) suitable for use as an energy-producing or combustion fuel.

Aqueous stream effluent 74 released from gas/liquid separator 66 after processing of residual organics may be rich in nutrients 76. Nutrients 76 may include, but are not limited to, e.g., dissolved gases including $CO_2$ and nitrogen (N) (e.g., in the form of ammonia); minerals such as, e.g., iron, copper, zinc, and like elements; sulfate; potassium (K), dissolved $CO_2$, and/or other nutrients. Nutrients 76 present in aqueous effluent 74 released from separator 66 may be recovered and/or recycled, e.g., by returning nutrients 76 into growth stage 2 to promote growth of algae or other biomass feedstocks. When stripped of nutrients 76, aqueous effluent 74 may be recycled or ultimately released as a clean water 78 fraction. No limitations are intended.

Carbon dioxide gas 70 dissolved or otherwise present in aqueous effluent 74 released from CHG stage 80 may also be recycled. For example, aqueous effluent 74 released from gas/liquid separator 66 may be saturated with $CO_2$ 70, which may be sparged into biomass growth stage 2 to promote growth of algae or other biomass feedstocks in another biomass growth cycle for harvesting and conversion in the HTL-CHG stage and process. $CO_2$ gas 70 may also be recovered from effluent stream 74. No limitations are intended.

In various embodiments, hydrocarbon product gases 72 separated from effluent stream 74 in the flowsheet may be used to generate process heat, to generate electricity, or to generate other chemicals. For example, hydrocarbon product gas 72 released from separator 66 may be cleaner than biogas derived from anaerobic digesters or landfills and thus can be directly burned or upgraded to natural gas by removing carbon dioxide present within effluent gas stream 72.

Biomass conversion system 100 or process may include one or more heat exchangers configured to maintain heat balance within the system. While heat exchangers and heaters are described herein, it should be understood that heat exchangers and heaters are optional. The present invention provides heat efficiencies that can eliminate need for burners or heaters required to drive finishing and inter-stage heat exchangers. All uses of heat derived from process flows described herein as will be selected by those of ordinary skill in the art in view of the disclosure are within the scope of the invention. No limitations are intended.

Heat exchangers may be of a counter-current design to recover and redirect recovered heat as an input or addition to fluid streams at various points of entry to process flows described herein. Heat exchangers may also be of an energized design (e.g., fired or burner type) that increase temperatures of fluids or effluent streams to suitable stage process temperatures that can drive chemistries in the selected HTL or CHG stages. No limitations are intended.

In some embodiments, HTL effluent 34 containing residual organics released from separator 20 may be introduced through a heat exchanger 57 or a make-up heater 57, e.g., of a fired or burner-type positioned, e.g., downstream from HTL stage 25. Heat exchanger 57 may be configured to supply heat lost from HTL effluent 34 in transit through separator 20 or other system components after release from HTL stage 25. Make-up heater/exchanger 57 may bring temperature of aqueous effluent 34 back up to process temperatures needed for gasification in CHG stage 80.

In some embodiments, a heat exchanger 56, e.g., of a counter-current type may also be positioned, e.g., after CHG stage 80 to recover heat from effluent 60 after exiting CHG reactor 50. Recovered heat may be diverted or used to preheat biomass feedstock 8 introduced to HTL stage 25, or to provide heat to other processes employed in conversion of biomass feedstock 8.

In some embodiments, bio-oils 22 separated from effluent stream 18 in separator 20 may be fed through a heat exchanger 58 or a make-up heater 58, e.g., of a fired or burner-type positioned, e.g., downstream from HTL stage 25 to supply heat lost to bio-oil 22 after release from HTL stage 25 in transit through separator 20 or other system components. In some embodiments, make-up heater/exchanger 58 may optionally bring temperature of bio-oil 22 to a temperature required in an upgrade stage 24 described hereafter.

Bio-oil 22 may be upgraded in upgrade stage 24 (e.g., a hydrotreatment facility) in a hydrogen atmosphere at selected pressures and temperatures (e.g., up to about 400° C.) to yield a green crude 30. "Green crude" as the term is used herein means a bio-oil that when upgraded is in a form suitable for introduction as a bio-based feedstock to a petroleum refinery for conversion or refinery processing to suitable fuels including, e.g., diesel and gasoline. Green crude may include exemplary compounds including, but not limited to, e.g., linear hydrocarbons, cyclic hydrocarbons, aromatic hydrocarbons, alkylated forms of these various compounds, and combinations of these various compounds. No limitations are intended.

Green crude 30 released from upgrade stage 24 may represent only 10% of the mass of the input feedstock (assuming 20% solids in the feedstock and 50% conversion of solids to bio-oil), but may contain significant heat energy. As such, green crude 30 released from upgrade stage 24 may be fed through a heat exchanger 59, e.g., of a counter-current type positioned, e.g., downstream from HTL stage 25 to recover higher temperature heat from effluent 30 exiting upgrade stage 24. Higher temperature heat recovered in heat exchanger 59 may be diverted or used to increase the temperature of preheated stream 8 after exiting heat exchanger 56 that is subsequently introduced to HTL stage 25 for processing therein. Heat recovered in heat exchanger 59 may also be used to provide heat to other processes employed in conversion of biomass feedstock 8.

In various embodiments, effluent gases released from CHG stage 80 may also be used to deliver finishing heat to biomass feedstocks 8 introduced to HTL stage 25 and/or heat for inter-stage reheating of effluents between the HTL 25 and CHG stages 80. No limitations are intended.

HTL and CHG processes of the present invention are complementary and together achieve a high conversion of biomass to bio-based fuels. The HTL stage or process produces both bio-oil and effluent water. In some embodiments, up to 50% of the biomass may be converted to bio-oil. Biomass remaining within the effluent water may be rich in energy and can be recovered by CHG. For example, remaining biomass may be gasified in the CHG stage to methane and carbon dioxide. CHG can also provide recovery of plant nutrients as detailed herein. The HTL-CHG system of the present invention allows up to 85% of the feedstock carbon to be recovered as fuel, with the remainder being converted to carbon dioxide. As will be understood by those of ordinary skill in the art, the degree of biomass conversion depends at least in part on the type of feedstock used. Thus, no limitations are intended.

TABLE 1 lists summary results for a combined HTL-CHG test conducted on whole algae and biomass derived from algae.

TABLE 1 lists summary results for a combined HTL-CHG test.

| ITEM | HTL Bio-oil Mass Yield (%) | HTL Carbon Yield (%) | CHG Carbon Yield (%) | TOTAL CARBON Yield to Fuel Products (gas/liquid) (%) |
|---|---|---|---|---|
| Whole Nannochloropsis salina | 58 | 69 | 17 | 86 |
| Predicted* | 41 | 50 | 24 | 74 |

*Predicted = yields for non-lipid producing algae

Results show hydrothermal processing is a highly efficient method for producing fuel from plant-derived feedstocks, algae being representative but not exclusive. With tandem HTL-CHG operation, system 100 can provide significant economies of scale, e.g., in heating (e.g., in concert with heat exchangers 56, 57, 58, and 59), pumping, and other system components not observed when HTL stage 25 or CHG stage 80 operate absent the other. HTL can produce high yields of bio-oil from both lipid-producing and non-lipid-producing algae. Results show that the combined HTL-CHG system 100 currently provides a recovery of at least about 85% or more of the total biomass carbon in the form of usable fuels. Subsequent gasification of the bio-oil and residual organics fraction obtained from the HTL effluent can be introduced in the CHG stage or process and produce additional fuel. In addition, nutrients in the water fraction obtained from the CHG stage or process can be recovered and recycled, e.g., back to algae growth ponds. Further optimization is envisioned.

Catalytic Gasification

Gasification of residual organics of any form in aqueous phase effluents released from the HTL stage may proceed according to the reaction shown in Equation [1]:

$$C_xH_yO_z + nH_2O \rightarrow aCH_4 + bCO_2 \qquad [1]$$

The gasification reaction is an equilibrium controlled reaction that may involve, e.g., steam reforming & methanation in the CHG reactor. Here, CHO designates the various hydrocarbons that may be released into the aqueous effluent from the CHG reactor. Variables x, y, z, n, a, and b correspond to various stoichiometric quantities of carbon, hydrogen, oxygen, water, methane, and carbon dioxide, respectively, that can enter the effluent stream. As will be appreciated by those of ordinary skill in the art, hydrocarbons present within the aqueous effluents released from the HTL stage or process will depend at least in part on the source of biomass from which the hydrocarbons are derived. For example, organics stemming from algae biomass will have an HCO content, water content, methane content, and carbon dioxide content that differ from organics stemming, e.g., from LEA biomass, animal biomass, or other biomass sources. No limitation to any one class of hydrocarbons is intended.

Gasification (CHG) Catalysts

Gasification catalysts suitable for use may include, but are not limited to, e.g., ruthenium (Ru), rhodium (Rh), osmium (Os), nickel (Ni), copper (Cu), including combinations of these catalysts.

Temperatures and Pressures

In various embodiments, temperatures and pressures may be maintained through the HTL stage or process, through the various separator stages, and through the CHG stage or process.

In some embodiments, the HTL stage or process may be operated at a temperature up to about 350° C. and a pressure up to about 200 atm. Depending on these process conditions, and whether a catalyst is used, output from the HTL stage or process can be either a liquid or a gas. However, temperatures and pressures are not intended to be limited provided the aqueous medium contains at least some quantity of a condensed (i.e., liquid water) phase during conversion of the biomass.

In some embodiments, liquefaction and gasification may both be performed at a temperature up to about 350° C. (662° F.) and a pressure up to about 200 atm. (3000 psi). In some embodiments, liquefaction and gasification may be performed at a temperature between about 300° C. and about 360° C. and a pressure between about 100 atmospheres and up to about 210 atmospheres.

In some embodiments, process conditions for HTL stage and CHG stage may be identical so that effluent water from HTL stage may be introduced directly to the catalyst bed in CHG stage that avoids loss of heat and pressure and efficiently recovers energy remaining in the HTL effluent water.

In some embodiments, gasification in the CHG stage may be performed at a temperature up to about 350° C. (662° F.) and a pressure up to about 200 atmospheres (3000 psi). In some embodiments, gasification may be performed at a temperature between about 300° C. and about 360° C. and a pressure between about 100 atmospheres and about 210 atmospheres.

Upgrading HTL-Derived Bio-Oils

Figure 2:
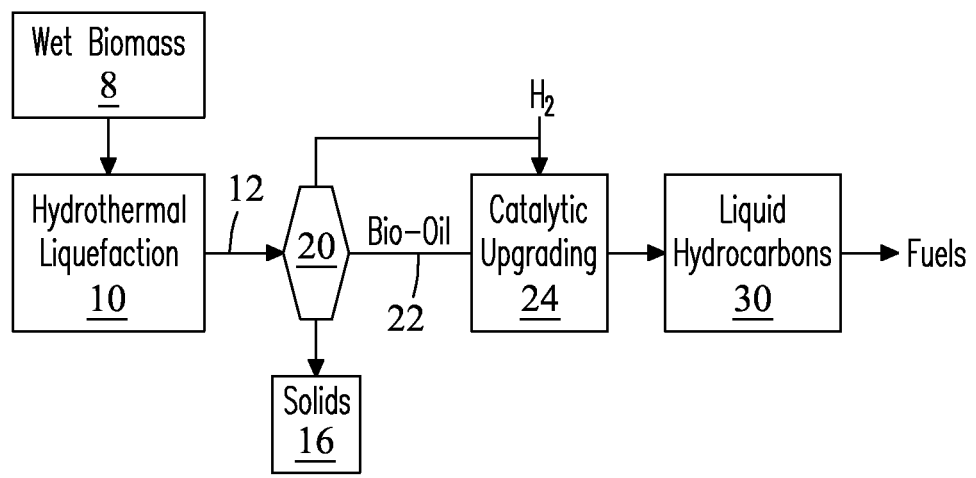
FIG. 2 shows a flowsheet for upgrading HTL-derived bio-oils in accordance with the present invention.

FIG. 2 shows an exemplary flowsheet and process for upgrading HTL derived bio-oils in accordance with the present invention. In the figure, wet biomass 8 may be liquefied in an HTL reactor 10 described previously in reference to FIG. 1, producing a biomass conversion product 12 containing, e.g., a mixture of solids, bio-oil, and water. Conversion product 12 may be separated in a separator 20 into a fraction containing solids 16 and a fraction containing bio-oil 22. Bio-oil 22 released from separation stage (separator) 20 may be upgraded, e.g., by hydrotreating bio-oil 22 in a hydrotreatment stage (hydrotreater) 24 over a suitable hydrotreatment catalyst that adds hydrogen under pressure, to form a green crude 30 containing various liquid hydrocarbons that may processed into suitable fuels including, e.g., diesel and gasoline.

Figure 3:
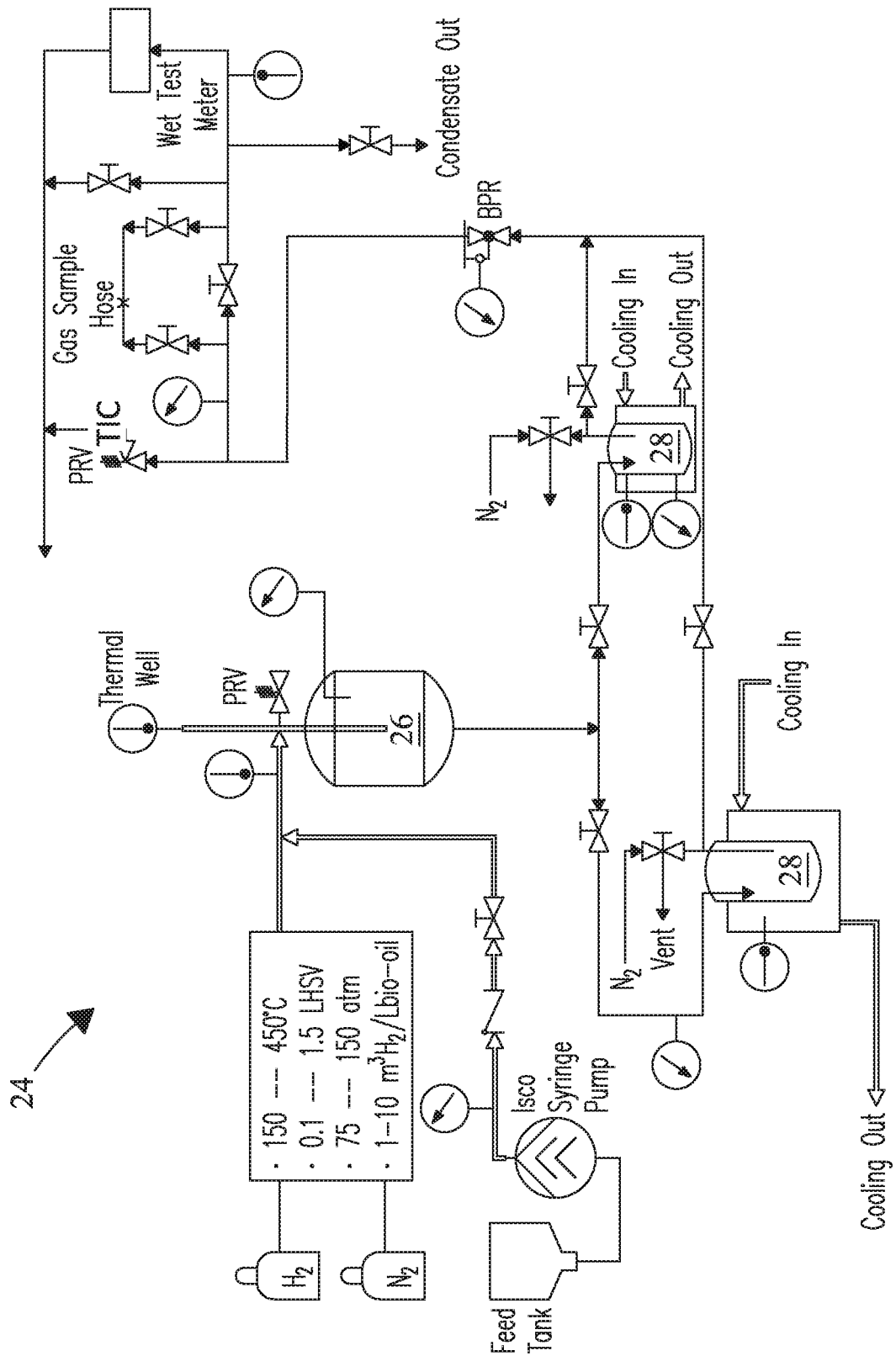
FIG. 3 shows an exemplary upgrade stage for upgrading HTL-derived bio-oils in accordance with the present invention.

FIG. 3 shows an exemplary upgrade stage 24 for upgrading HTL-derived bio-oils in accordance with the present invention. Bio-oils may be upgraded by hydrotreating the bio-oil to yield a green crude oxygen-containing hydrocarbons in the bio-oil including, e.g., cyclic ketones, furans, and phenols may be converted to linear hydrocarbons, cyclic hydrocarbons, and aromatic hydrocarbons with a carbon number in the range from about C=6 to about C=45, as detailed further herein.

As shown in the figure, upgrade stage 24 may include a hydrotreatment reactor (hydrotreater) 26 constructed, e.g., of stainless steel (e.g., 300 series stainless steel) to minimize corrosion. Volumes are not limited. Hydrotreater 26 may be filled with a hydrogenation catalyst as detailed herein. In the exemplary embodiment, hydrotreater 26 may operate in a continuous flow mode at a flow rate that optimizes efficiency, but operation is not limited thereto. For example, batch operation may also be considered.

Hydrogen gas (excess) may be introduced into the hydrotreatment reactor 26 through a catalyst bed therein, e.g., in a "trickle-bed" fashion. Gas products may proceed out of reactor 26 continuously while liquid products may be recovered, e.g., in one or more receivers 28. Receivers 28 may be cycled online and offline in order to be alternately filled and drained. Pressure control may be maintained on the offgas stream such that liquids may be captured in receivers 28 and cooled at pressure. Liquid product may be recovered by depressurizing and draining receivers 28 while valved off-line.

In various embodiments, hydrotreating the bio-oil in hydrotreatment stage (hydrotreater) 24 may be conducted at temperatures between about 150° C. and about 450° C.

In various embodiments, feed rates for introducing bio-oil into the hydrotreatment reactor (hydrotreater) may be at a Liquid Hourly Space Velocity of from about 0.1 LHSV to about 1.5 LHSV, but flows are adjustable to maximize and optimize hydrogenation. Thus, LHSV rates are not intended to be limited.

In some embodiments, hydrogen partial pressures in the hydrotreater may be from about 75 atm ($7.6 \times 10^3$ kPa) to about 150 atm ($1.52 \times 10^4$ kPa), Total quantity of hydrogen ($H_2$) for upgrading a typical bio-oil may be from about 1 $m^3$ to about 10 $m^3$ per liter of bio-oil. Upgrading HTL bio-oils of the present invention in the hydrotreating stage and process can require less $H_2$ compared with conventional Fast Pyrolysis bio-oils.

Hydrotreating the bio-oil serves to remove heteroatoms such as sulfur (S), oxygen (O), and nitrogen (N) from hydrocarbons in the bio-oil. For example, hydrotreating the HTL bio-oil can remove oxygen, nitrogen, and sulfur heteroatom-containing compounds to part-per-million levels in the bio-oil. While results for algae-derived biomass are described herein, heteroatom concentrations depend at least in part on the source of biomass. For example, biomass derived from wood can have heteroatom contents lower than that of algae-derived biomass by about an order of magnitude. Thus, no limitations on specific heteroatom contents are intended.

In some embodiments, the bio-oil (green crude) after upgrading may have an oxygen content below about 10 wt %. In some embodiments, the crude bio-oil may have an oxygen content between about 5 wt % and about 10 wt %. In some embodiments, the upgraded bio-oil may have an oxygen (O) heteroatom content after upgrading below about 1% by weight. In some embodiments, the upgraded bio-oil after upgrading may have an oxygen (O) heteroatom content below about 500 ppm at a current limit of detection.

In some embodiments, crude bio-oil from HTL may include a nitrogen heteroatom content at or below about 4 wt %. In some embodiments, the crude bio-oil after upgrading may include a nitrogen heteroatom content below 500 parts-per-million at a current limit of detection. No limitations are intended by these exemplary results.

In some embodiments, the crude bio-oil from HTL may include a sulfur as high as 0.4 wt %. In some embodiments, the upgraded bio-oil may have a sulfur (S) heteroatom content after upgrading at or below about 50 ppm at a current limit of detection. No limitations are intended by these exemplary results.

Hydrotreatment Catalysts

Hydrotreatment catalysts suitable for use in hydrotreating bio-oils may be any catalyst employed for hydrotreating petroleum oils including, but not limited to, e.g., sulfided cobalt (Co) catalysts, sulfided molybdenum (Mo) catalysts, and sulfided nickel (Ni) catalysts. No limitations are intended.

Crude Bio-Oil Hydrocarbons

Figure 4:
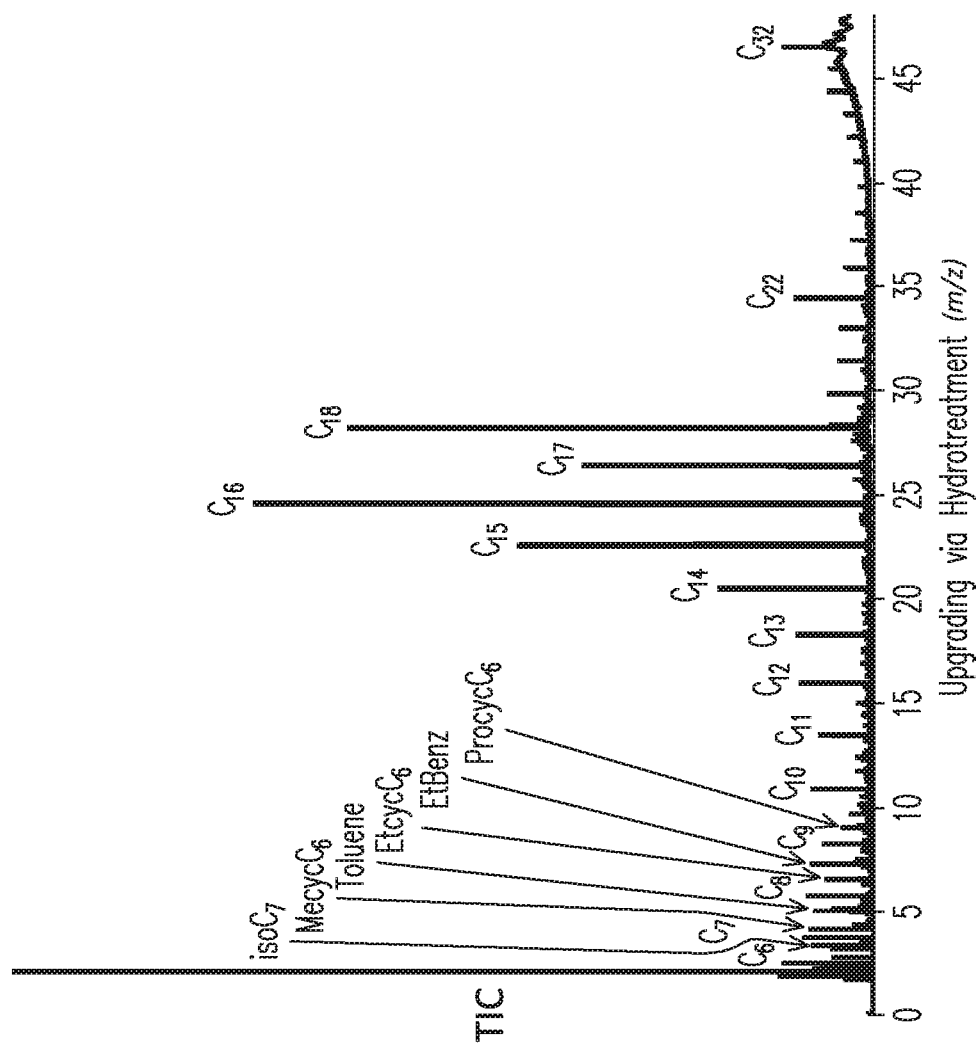
FIG. 4 is a plot showing exemplary bio-oil hydrocarbons upgraded in accordance with the present invention to bio-based feedstock hydrocarbons suitable for use in a petroleum refinery.

FIG. 4 shows representative and exemplary hydrocarbons that may be obtained from upgraded (e.g., hydrotreated and/or hydrocracked) HTL-derived bio-oils in accordance with the present invention. In various embodiments, hydrotreated green crudes of the present invention may contain various hydrocarbons including, but not limited to, e.g., linear hydrocarbons, cyclic hydrocarbons, aromatic hydrocarbons, and alkylated forms of these various hydrocarbon moieties similar to those present within fossil crudes. Bio-based crudes of the present invention are suitable for use as feedstocks in petroleum distillation refineries and can be refined conventionally.

In some embodiments, hydrotreated bio-oil products may have volumes that are about 90% to about 94% of those of the original bio-oil.

In some embodiments, bio-oils derived from biomass sources may be hydrotreated and converted to bio-based green crudes of the present invention with carbon numbers from about C=6 to about C=45. In some embodiments, carbon numbers will be between about C=14 to about C=18. In other embodiments, carbon numbers will be between about C=18 and about C=45.

In some various embodiments, bio-based green crudes may be converted out of system into high-grade (containing low heteroatom contents as described hereinabove) bio-based fuels including, e.g., diesel, jet fuel, and gasoline.

As will be appreciated by those of ordinary skill in the art, given the diverse nature of biomass sources, various combinations and classes of hydrocarbons can be expected with various carbon numbers. Thus, no limitations are intended.

Chemical Oxygen Demand

Chemical Oxygen Demand (COD) is a measure of the quantity of residual organics (also termed "waste byproducts") present in effluent streams exiting the CHG stage. COD measures the mass of oxygen consumed per liter of solution (in mg/L or ppm). Aqueous effluents released from the CHG stage can be tailored to yield a Chemical Oxygen Demand (COD) value that assesses the toxicity of water exiting the CHG stage so that it can be reused or recycled back for another HTL cycle or CHG cycle or permits ultimate release of aqueous effluents. Reuse and recycling of these aqueous effluents can maximize efficiency of the flowsheet. As an example, recycling aqueous effluents back as an input to the liquefaction step can reduce costs of added alkali. COD values below 1000 ppm are sufficiently high to allow sufficient flow rates for operation, but are sufficiently low to allow reuse and recycle of effluents without toxicity to plant growth. No limitation in COD values is intended by the present flowsheets.

EXAMPLES

The following Examples provide a further understanding of the present invention.

Example 1

Conversion of Lipid Extracted Algae (LEA), *Nannochloropsis salina*

The system of FIG. 1 was used. A lipid-extracted algae (LEA) biomass composed of *Nannochloropsis salina* with triacylglycerides (TAGs) removed was obtained commercially (Solix BioSystems, Ft. Collins, Colo., USA). The LEA algae biomass sample was made into a slurry containing ~20% dry solids and 80% water. The biomass sample slurry was introduced as a feedstock into the HTL stage reactor. Additional bio-oil was produced in the HTL stage from lipids, proteins, and carbohydrates present within the LEA biomass feedstock. Resultant bio-oil was upgraded subsequently in a catalytic hydrotreater, as detailed herein. TABLE 2 lists results from the HTL test of the LEA sample. TABLE 2 lists results of HTL test of LEA

TABLE 2

| lists results of HTL test of LEA | |
|---|---|
| ITEM | DATA (%) |
| Lipid content of whole algae | 47 |
| Lipid content of LEA after extraction (i.e., membrane and FFA) | 20 |
| Bio-oil from HTL as % LEA mass | 46 |
| Bio-oil from HTL as % LEA AFDW | 52 |
| Percent of LEA carbon in HTL Bio-oil | 54 |

Example 2

Conversion of Whole Algae, *Nannochloropsis salina*

The system of FIG. 1 was used. Pressure was 3000 psig. A LHSV value of about 2 was used. Temperature was up to 360° C. Liquefaction in the HTL stage was performed without a catalyst. Catalyst in the CHG reactor was a ruthenium (Ru)-on-carbon (Ru/C) catalyst. A whole algae sample composed of *Nannochloropsis salina* (Solix BioSystems, Ft. Collins, Colo., USA) frozen immediately after harvesting with no additional extraction processing to remove lipids was introduced to the HTL. The bio-oil/water mixture recovered from the conversion of the algae sample in the HTL stage run was separated into separate bio-oil fraction and a water fraction. Effluent water from the HTL containing residual organics was introduced to the CHG and converted into methane. TABLE 3 lists results from the HTL-CHG conversion of whole algae.

TABLE 3 lists results from the combined HTL-CHG test of whole algae sample.

TABLE 3

| lists results from the combined HTL-CHG test of whole algae sample. | |
|---|---|
| ITEM | DATA (%) |
| Lipid content of whole algae | 33 |
| Lipid content from HTL as % of algae mass | 58 |
| Bio-oil from HTL as % algae AFDW | 64 |
| Percent of algae carbon in HTL Bio-oil | 69 |
| Mass of organic residual in HTL effluent water fraction | 34 |
| Percent of organic in effluent water fraction converted to CH4 | 50 |
| Total carbon recovery as fuel (i.e., oil + CH4) | 86 |

While exemplary embodiments of the present invention have been described herein, it is to be distinctly understood that this invention is not limited thereto but may be variously embodied to practice within the scope of the following claims. It will be apparent to those skilled in the art that many changes and modifications may be made without departing from the invention in its true scope and broader aspects. The appended claims are therefore intended to cover all such changes and modifications as fall within the scope of the invention.

What is claimed is:

1. A system for conversion of a biomass, the system comprising:
   a hydrothermal liquefaction (HTL) stage apparatus that hydrothermally liquefies the biomass in an aqueous medium at a temperature and pressure selected to form a crude conversion product comprising separable fractions including a bio-oil fraction defined by droplets, an aqueous fraction containing residual organics, and a solids fraction;
   a solids separation stage apparatus configured to receive the crude conversion product and separate the solids fraction from the crude conversion product to form a solids-free conversion product comprising the bio-oil fraction and the aqueous fraction containing residual organics;
   an enclosed separation stage apparatus configured to receive the solids-free conversion product and separate the bio-oil fraction from the aqueous fraction containing residual organics, the enclosed separation stage apparatus defining an internal geometry configured to coalesce the droplets of the bio-oil fraction, the enclosed separation stage apparatus also defining a discharge path configured for continuous separation of the droplets of the bio-oil fraction from the aqueous fraction containing residual organics; and
   a catalytic hydrothermal gasification (CHG) stage apparatus operatively coupled to the enclosed separation stage apparatus and configured to receive the aqueous fraction containing residual organics from the enclosed separation stage apparatus at a selected temperature and pressure that forms a gas product containing at least one medium BTU product gas.

2. The system of claim 1, further including an upgrade stage apparatus configured to upgrade the bio-oil fraction released from the enclosed stage separation apparatus over a hydrogenation catalyst at a temperature up to about 450° C. and a hydrogen partial pressure up to about 150 atmospheres ($1.52 \times 10^4$ kPa) that yields a green crude.

3. The system of claim 2 further comprising at least one heat exchanger operatively coupled to the upgrade stage apparatus.

4. The system of claim 3 further comprising another heat exchanger operatively coupled to the hydrothermal liquefaction (HTL) stage apparatus.

5. The system of claim 4 wherein the heat exchangers are operably engaged to exchange thermal transfer fluid.

6. The system of claim 1, wherein the gas product when combusted generates sufficient energy such that the sum of the energy demands for conversion of the biomass to the product gas is a net positive.

7. The system of claim 1, further including one or more heat exchangers positioned to distribute heat to selected locations in the HTL stage apparatus and/or the CHG stage apparatus.

8. The system of claim 1, further comprising a make up heater operably engaged between the catalytic hydrothermal gasification (CHG) stage apparatus and the enclosed separation stage apparatus.

* * * * *

UNITED STATES PATENT AND TRADEMARK OFFICE
CERTIFICATE OF CORRECTION

PATENT NO. : 11,407,946 B2
APPLICATION NO. : 16/179495
DATED : August 9, 2022
INVENTOR(S) : Douglas C. Elliott, Gary G. Neuenschwander and Todd R. Hart Page 1 of 1

It is certified that error appears in the above-identified patent and that said Letters Patent is hereby corrected as shown below:

On the Title Page

Item (56) References Cited, page 2, $1^{st}$ Column, $5^{th}$ Line - Replace "9,756,728 B2 9/2017 Elliott et al." with --9,758,728 B2 9/2017 Elliott et al.--

Item (56) References Cited, page 2, $2^{nd}$ Column, $1^{st}$ and $2^{nd}$ Lines - Replace "WO PCT/US2013/041214 10/2013" with --WO PCT/US2013/041214 Search Report 10/2013 WO PCT/US2013/041214 Written Opinion 10/2013--

Item (56) References Cited, page 2, $2^{nd}$ Column, $3^{rd}$ and $4^{th}$ Lines - Replace "WO PCT/US2013/041214 12/2014" with --WO PCT/US2013/041214 IPRP 12/2014--

Item (56) References Cited, page 2, $2^{nd}$ Column, $5^{th}$ and $6^{th}$ Lines - Replace "WO PCT/US2016/036622 9/2016" with --WO PCT/US2016/036622 Search Report 9/2016 WO PCT/US2016/036622 Written Opinion 9/2016--

Item (56) References Cited, page 2, $2^{nd}$ Column, $7^{th}$ and $8^{th}$ Lines - Replace "WO PCT/US2016/036622 12/2017" with --WO PCT/US2016/036622 IPRP 12/2017--

Item (56) References Cited, page 2, $2^{nd}$ Column, $39^{th}$ Line - Replace "Frank, E.D., et al. Life cycle comparison of hydrothermal liquefac-" with --Frank, E.D., et al., "Life cycle comparison of hydrothermal liquefac- --

Item (56) References Cited, page 2, $2^{nd}$ Column, $40^{th}$ Line - Replace "tion and lipid extraction pathways to renewable diesel from algae," with --tion and lipid extraction pathways to renewable diesel from algae",--

Signed and Sealed this
Thirty-first Day of December, 2024

Derrick Brent
*Acting Director of the United States Patent and Trademark Office*